Figure 1:
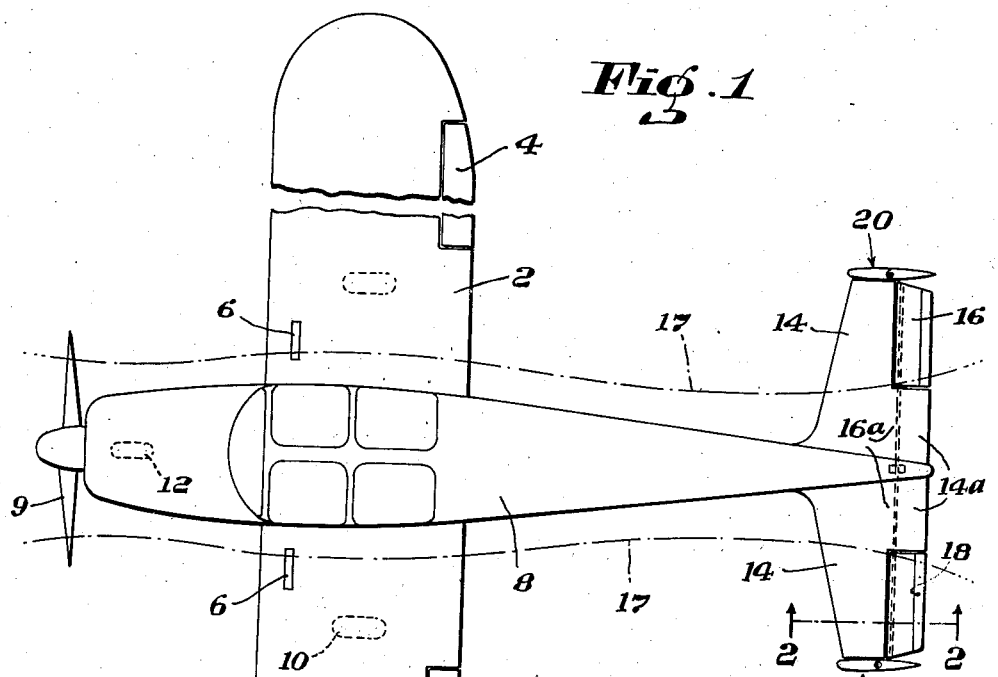

July 18, 1944.  O. C. KOPPEN  2,353,907

AIRPLANE

Filed Aug. 9, 1943

INVENTOR.
Otto C. Koppen
BY
H. F. Kirkpatrick
ATTORNEY

Patented July 18, 1944

2,353,907

UNITED STATES PATENT OFFICE 2,353,907

AIRPLANE

Otto C. Koppen, Newton, Mass., assignor to General Aircraft Corporation, Dover, Del., a corporation of Delaware Application August 9, 1943, Serial No. 497,907

2 Claims. (Cl. 244—87)

This invention relates to airplanes and has for its object to provide an improved airplane from the standpoint of longitudinal (pitching) control so as in flight to substantially or practically avoid differences in required "stick" forces and in balancing of the airplane, whether in power-on or power-off condition.

Figure 2:
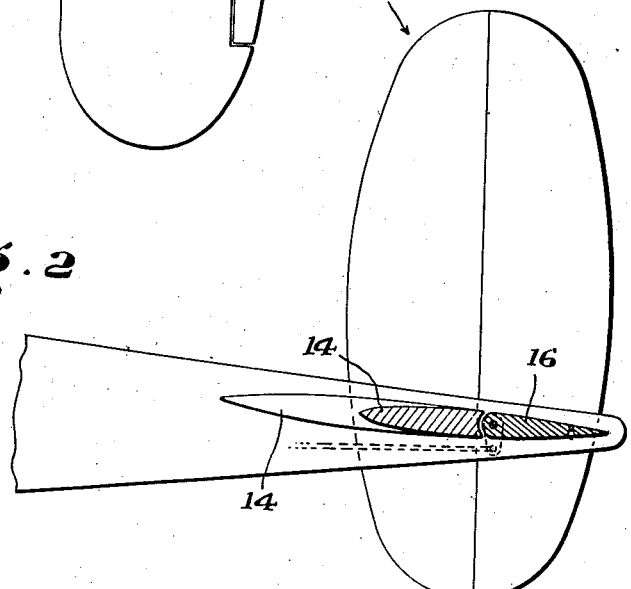

In the drawing:

Fig. 1 is a plan view of an airplane made according to a preferred embodiment of the invention; and Fig. 2 is an enlarged side elevation of the empennage and rear end of the fuselage of the airplane of Fig. 1.

Referring to the drawing, in which like numerals represent like parts, the airplane has a wing 2, with ailerons 4 and spoilers 6, affixed to a fuselage 8 with nose, body and tail portions, having a tractor propeller 9 at its nose. To the fuselage 8 are suitably affixed main landing wheels 10 and a nose wheel 12, though present-day conventional landing gear with the main landing wheels forward and a tail wheel will answer equally well so far as concerns the present invention. The fuselage 8 carries at its tail portion a novel stabilizer and elevator organization having, laterally extending, on each side of the fuselage tail portion, a horizontal fixed stabilizer 14 (extending across the propeller slipstream when the airplane is in normal level flight attitude) and elevators 16 with each elevator 16 laterally spaced from the after end of the fuselage tail portion and mounted and disposed substantially outside the outside boundary of the zone of the slip-stream, (which normally does not exceed .9 of the propeller diameter) generally indicated at 17, in this way substantially eliminating slip-stream effect on the elevators in an airplane with a conventional fuselage tail portion as illustrated in Figs. 1 and 2. The left elevator 16, as shown in the drawing, has at its rear edge a trim tab 18, with a suitable adjustment (not shown) for compensating for differences in fore and aft loading of the airplane. Preferably, each half of the stabilizer is of general L formation as shown, and includes an in-board portion 14a extending rearwardly of the hinge line 16a of the elevator 16 and constituting an extension of the main portion of the stabilizer. This provides structural as well as aerodynamic advantages in that the novel stabilizer-elevator-combination can be somewhat more solidly affixed to the fuselage and also minimize tip losses at the in-board end of each elevator 16. The vertical tail surfaces, generally designated 20, carried by the outer ends of the stabilizer 14, also serve to minimize elevator tip losses. The vertical tail may be either of the usual vertical fin and movable rudder type centrally located with reference to the propeller, or, preferably, comprises two vertical tails of said type, as shown. Alternatively, it may embody two fixed vertical fins, for example, as in the rudderless airplane described and shown in my Patent No. 2,196,994 of April 16, 1940, in which case the entire outboard end of each elevator is preferably adjacent the inner surface of the adjacent fixed vertical fin, though with working clearance. Whichever type of vertical tail be employed, they are preferably so supported and placed as to avoid the turning and rolling effect of propeller slipstream rotation, as shown in the drawing, so that they, too, as well as the elevators, are, as a practical matter, free from interference or differences in effect and operation whether or not power in any substantial amount is being employed.

The airplane, as herein described, particularly in the preferred form, thus further simplifies the flying of small and medium size airplanes, particularly by those who lack training, skill, or current experience with a given airplane which perhaps may be of different size and weight than the pilot has been used to. Since the required control forces and movements are substantially the same in flight, whether the power be on or off, any experience in flying the airplane at the lower end of its speed range, either power-on or power-off, at altitude, may be directly translated and repeated so as to secure substantially the same changes in pitch at such air speeds and thus very much simplify the making of consistently good approaches and landings which ordinarily are the most troublesome operations for unskilled pilots. Moreover, changes of trim with power will be small so that the elevator control will not need to be synchronized with the throttle when the latter is moved for flight path corrections, particularly during landing. Similarly as to take-off and climb where little or no actuation or "holding" of rudder controls (if any) is required.

Having described my invention, what I claim is:

1. An airplane having in combination, a supporting wing, a fuselage having nose, body and tail portions, a single tractor propeller at the nose having its axis substantially in the vertical plane of the longitudinal axis of said fuselage, a horizontal stabilizer laterally extending on each side of the tail portion of said fuselage in general L form and extending across the propeller slipstream in normal level flight attitude, said stabilizer in normal flight presenting to the propeller slipstream only normally fixed surfaces, a single pair of elevators mounted on the stabilizer with each elevator laterally spaced a substantial distance from said fuselage, each hingedly mounted in the angle of an L of said stabilizer thereby minimizing elevator tip losses at the in-board end of each said elevator and having its major portion located laterally outside the zone of the propeller slipstream, and vertical tail surface means symmetrically disposed with reference to said propeller axis.

2. An airplane having in combination, a supporting wing, a fuselage having nose, body and tail portions, a single tractor propeller at the nose having its axis substantially in the vertical plane of the longitudinal axis of said fuselage, a horizontal stabilizer laterally extending on each side of the tail portion of said fuselage in general L form and extending across the propeller slipstream in normal level flight attitude, said stabilizer in normal flight presenting to the propeller slipstream only normally fixed surfaces, a single pair of elevators mounted on the stabilizer with each elevator laterally spaced a substantial distance from said fuselage and each hingedly mounted in the angle of an L of said stabilizer, thereby minimizing elevator tip losses at the in-board end of each said elevator and having its major portion located laterally outside the zone of the propeller slipstream, and vertical tail surfaces mounted on the outer ends of said stabilizers, said vertical tail surfaces minimizing elevator tip losses at the outboard ends of said elevators.

OTTO C. KOPPEN.